US011055685B2

(12) United States Patent
Tribble et al.

(10) Patent No.: US 11,055,685 B2
(45) Date of Patent: Jul. 6, 2021

(54) SORTED PARALLEL PROCESSING OF A LARGE DATASET

(71) Applicant: Capital One Services, LLC, McLean, VA (US)

(72) Inventors: Matthew L. Tribble, Plano, TX (US); Hala Salim El-Ali, Murphy, TX (US)

(73) Assignee: Capital One Services, LLC, McLean, VA (US)

(*) Notice: Subject to any disclaimer, the term of this patent is extended or adjusted under 35 U.S.C. 154(b) by 1 day.

(21) Appl. No.: 16/453,947

(22) Filed: Jun. 26, 2019

(65) Prior Publication Data

US 2020/0410471 A1 Dec. 31, 2020

(51) Int. Cl.
*G06Q 20/24* (2012.01)
*G06F 16/9038* (2019.01)
*G06F 16/9035* (2019.01)
*G06Q 30/06* (2012.01)

(52) U.S. Cl.
CPC ......... *G06Q 20/24* (2013.01); *G06F 16/9035* (2019.01); *G06F 16/9038* (2019.01); *G06Q 30/0633* (2013.01)

(58) Field of Classification Search
CPC .................................................. G06Q 20/24
USPC .......................................................... 705/39
See application file for complete search history.

(56) References Cited

U.S. PATENT DOCUMENTS

| 2017/0287043 | A1  | 10/2017 | Swinson |
| 2018/0204281 | A1  | 7/2018  | Painter et al. |
| 2018/0218420 | A1  | 8/2018  | Cotton et al. |
| 2019/0114705 | A1* | 4/2019  | Wong .................. G06Q 40/025 |
| 2019/0130480 | A1  | 5/2019  | Brewbaker et al. |

\* cited by examiner

*Primary Examiner* — Cho Kwong
(74) *Attorney, Agent, or Firm* — Sterne, Kessler, Goldstein & Fox P.L.L.C.

(57) ABSTRACT

Disclosed herein are system, method, and computer program product embodiments for sorted parallel processing of large dataset to provide quicker search results to a user. An embodiment operates by receiving a search request containing a first attribute from a user, determining an intermediate result set of items in a database based on the search request, and sorting the items based on a second attribute of the items. The embodiment further operates by dividing the sorted items into a plurality of batches with sequential IDs, determining a result corresponding to the first attribute for each item in parallel, creating a sequentially-ordered list of determined results, identifying a subset of determined results based on a comparison between the determined results and a target result, determining a final result set of items, and returning at least a portion of the final result set of items to the user.

20 Claims, 6 Drawing Sheets

300

| Results | Index |
|---|---|
| $193.00 (1) | 0 |
| $196.00 (3) | 1 |
| $197.00 (2) | 2 |
| $200.00 (4) | 3 |
| $204.00 (5) | 4 |
| $206.00 (7) | 5 |
| $208.00 (6) | 6 |
| $210.00 (8) | 7 |
| $212.00 (10) | 8 |
| $214.00 (9) | 9 |
| $214.00 (12) | 10 |
| $216.00 (11) | 11 |
| $223.00 (13) | 12 |
| $226.00 (14) | 13 |
| $230.00 (15) | 14 |

| 0% APR Payment | Final Results Index |
|---|---|
| $10800/60=$180.00 | 0 |
| $11800/60=$197.00 | 2 |
| $12800/60=$213.00 | 8 |

STOP Flag — 320

316(1)

| Vehicle | Price | APR (%) | Payment |
|---|---|---|---|
| 1 | 10000 | 6 | $193.00 |
| 2 | 10200 | 6 | $197.00 |
| 3 | 10400 | 5 | $196.00 |
| 4 | 10600 | 5 | $200.00 |
| 5 | 10800 | 5 | $204.00 |

316(2)

| Vehicle | Price | APR (%) | Payment |
|---|---|---|---|
| 6 | 11000 | 5 | $208.00 |
| 7 | 11200 | 4 | $206.00 |
| 8 | 11400 | 4 | $210.00 |
| 9 | 11600 | 4 | $214.00 |
| 10 | 11800 | 3 | $212.00 |

316(3)

| Vehicle | Price | APR (%) | Payment |
|---|---|---|---|
| 11 | 12000 | 3 | $216.00 |
| 12 | 12200 | 2 | $214.00 |
| 13 | 12400 | 3 | $223.00 |
| 14 | 12600 | 4 | $226.00 |
| 15 | 12800 | 4 | $230.00 |

FIG. 3

SORTED PARALLEL PROCESSING OF A LARGE DATASET

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIG. 3 is an example use-case search result for sorted parallel processing of a large dataset of vehicle inventory, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
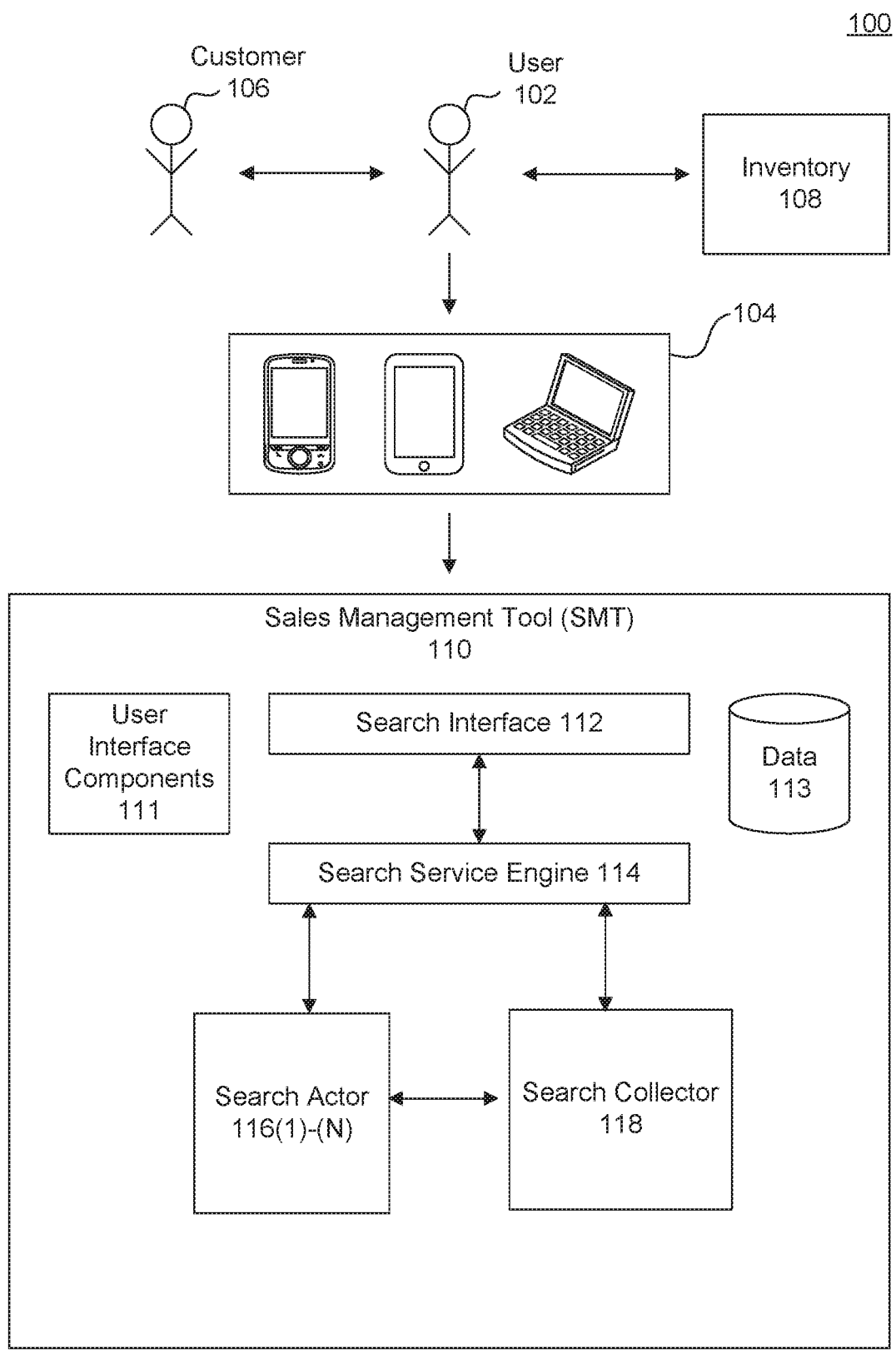
FIG. 1 is a block diagram of an environment for sorted parallel processing of a large dataset, according to some embodiments.

Provided herein are system, apparatus, device, method and/or computer program product embodiments, and/or combinations and sub-combinations thereof, for providing sorted parallel processing of a large dataset to enable quicker search results and take less computing time.

Data management tools can allow users the ability to search datasets for items that match a user's criteria of interest. Where a user searches for data using parameters that are already linked to the data, even when a dataset is large, a result set can be determined fairly quickly. However, if a user searches for data using parameters that have not been previously determined, but instead which must be calculated anew, the resultant processing burden can result in significant computational expense and delay in providing results to a user, as compared to the time it takes to sort based on a pre-determined parameter. This is because, when searching a dataset based on a parameter that has not already been determined for each item in the dataset, a search tool will typically calculate or otherwise determine the requested parameter for all items in the dataset, and then sort based on that calculated parameter. In such a search tool, results are not able to be returned until after the parameter has been calculated for all items, because the sorting cannot occur until the parameter is known for all items.

The batched, sorted parallel processing technique of embodiments of the present invention overcomes these issues by identifying an intermediate result set based on one parameter, sorting based on that parameter, and batching the intermediate result set based on that parameter. The requested parameter may then be calculated for each item in a given batch in parallel with other batches to create a sequentially-ordered list of the calculated results, so that items meeting the search requirements can be returned to a user as soon as a next-sequential batch is completed, with the sequentially-ordered batches ensuring that the results are returned to the user in the correct sort order.

In a vehicle search tool example, which will be referred to throughout this disclosure, a dataset of available vehicle inventory may characterize the vehicles owned by one or more participating vehicle dealerships and may include inventory information such as vehicle identification numbers, price, vehicle mileage, distance from user location, ownership history, vehicle characteristics such as make, model, year, color, and other vehicle-related data. As a participating dealership may acquire additional vehicles and sell vehicles, the dataset may be updated to reflect the changes in inventory. The following paragraphs will describe the interactions between a user and a sales management tool with respect to a vehicle dealership example, but one skilled in the relevant art(s) will appreciate that the described interactions apply equally to other sales paradigms, i.e., any situation to search through a large dataset of items, such as an inventory of items being offered for sale by a seller.

When a customer is searching for a vehicle, that customer may access a sales management tool to determine an appropriate vehicle meeting the customer's preferred criteria. The sales management tool may be, for example, embedded into or accessible by a website accessible to the customer, which allows the customer to input certain parameters of interest and view or otherwise interact with returned results that match the customer's criteria. To identify the appropriate vehicle, the sales management tool may assist the customer to search and sort through the large dataset of inventory based on the customer's search request. If the customer wants to search by attributes that are part of the inventory information, such as price, mileage, etc., the sales management tool can sort the inventory by these attributes and determine a final result set of vehicles based on the search request. Inventory information with the requested information for the final result set of vehicles can be presented in a sorted order to the customer. The sales management tool can determine a number of vehicles in the final result set to present, for example, on a first results web page or a first display screen to the customer. And the sales management tool can calculate monthly payment just for these number of vehicles and present these vehicles with monthly payment and inventory information on the first page.

However, the customer may want to search or sort by attributes that are not part of the inventory information. For example, the customer may want to find vehicles under a certain monthly payment, and the sales management tool may need to provide a list of vehicles sorted by monthly payment. Monthly payment depends on vehicle price and annual percentage rate (APR) specific to that customer, if the customer wants to finance it. As such, monthly payment information may not be available for each vehicle in the inventory because the monthly payment depends on several factors specific to the individual customer. The sales management tool thus may need to calculate monthly payments specific to the requesting customer for each vehicle. The inventory may have tens of thousands or millions of vehicles. Calculating a monthly payment for each vehicle for the specific customer may be computationally intensive, and time consuming. As such, the sales management tool may take longer time to present a list of vehicles sorted by monthly payment to the user if processed under traditional techniques.

FIG. 1 is a block diagram of an environment 100 for sorted parallel processing of a large dataset, according to some embodiments. Environment 100 may include user 102, computing device 104, customer 106, inventory 108, and sales management tool 110. In some embodiments, customer 106 and user 102 are the same individual or entity.

User 102 may be a customer of a business or organization, or user 102 may be a sales agent, employee, or other representative of that same or another business or organization. In one embodiment, user 102 may be a customer searching to purchase a vehicle, a vehicle dealership representative, or a third party representative assisting the customer in his or her search for a vehicle. In another embodiment, user 102 may be a customer or representative of any business or company having an inventory of other suitable items, e.g., an electronics retailer, a furniture store, etc. User 102 may be an individual (i.e., a human being) or group of such individuals. In yet another embodiment, user 102 may be an artificial intelligence construct. In some embodiments, user 102 may be a customer of a business interacting with sales management tool 110 to determine a suitable item without the assistance of a sales representative. In some embodiments, user 102 may access sales management tool 110 by accessing a stored user account, e.g., using a username/password combination.

Computing device 104 may be a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof. Therefore, it will also be appreciated that any two or more components of environment 100 may similarly be executed using some or all of the one or more computers in communication with one another. In some embodiments, computing device 104 may connect to sales management tool 110 via any network or combination of networks including the Internet, a local area network (LAN), a wide area network (WAN), a wireless network, a cellular network, or various other types of networks as would be appreciated by a person of ordinary skill in the art. In another embodiment, computing device 104 may have software installed thereon that facilitates the behaviors and functions of sales management tool 110.

Customer 106 may be an individual, group, or other construct seeking to purchase an item within an inventory. In one embodiment, customer 106 may be a consumer searching within an inventory to investigate the purchase of an automobile, truck, motorcycle, bicycle, or other vehicle. Customer 106 may submit a customer search request for a vehicle that includes data such as a monthly income, a price, a mileage, etc. In some embodiments, customer 106 may be tracked in sales management tool 110 with an appropriate user account associated with customer 106. In some embodiments, customer 106 may interact with systems that are ancillary to sales management tool 110, for example, personal banking systems. In some embodiments, customer 106 and user 102 are the same individual or entity.

Inventory 108 may be an inventory of tangible or intangible items available at one or more businesses or other commercial entity. In one embodiment, the items in inventory 108 are vehicles and the businesses offering the vehicles for sale include one or more car dealerships. In an embodiment, the sales management tool is supported by a third party entity, with the vehicles listed in inventory 108 being those belonging to dealerships in participation with that third party. In an embodiment, the third party entity offering the sales management tool is a bank or financing organization, and inventory 108 includes vehicles available for financing by that bank or financing organization. In an embodiment, inventory 108 may include vehicles being offered for sale by non-dealership car sellers, such as private sellers, in addition to or instead of car dealerships. In an embodiment, inventory 108 may include any available vehicles that can be presented to customer 106. In other embodiments, inventory 108 may be an inventory of electronics, furniture, or any other consumer product. Inventory 108 may be digital objects, such as media files, streams, or software. In some embodiments, the items in the inventory are not sold at all, rather rented, leased, or otherwise transferred from the seller to the buyer.

Sales management tool 110 may provide a search interface, via which user 102 may examine a representation of the items in inventory 108. Such a search page is described in further detail below with reference to FIG. 4. Sales management tool 110 may be accessed via a web page, an application programming interface (API), or other electronic connection. The entity hosting sales management tool 110 may be the same as or different from the entity hosting the search interface accessible by user 102. Sales management tool 110 may narrow, limit, sort, and/or filter the results displayed in the search results to those items in the inventory based on a user search request. Sales management tool 110 may enable quicker search results by sorted parallel processing for a large dataset of inventory. Sales management tool 110 may allow additional filtering, grouping, sorting, etc. of the search results. Sales management tool 110 may include user interface component 111, search interface 112, data store 113, search service engine 114, a plurality of search actors 116(1)-(N), and search collector 118.

Figure 4:
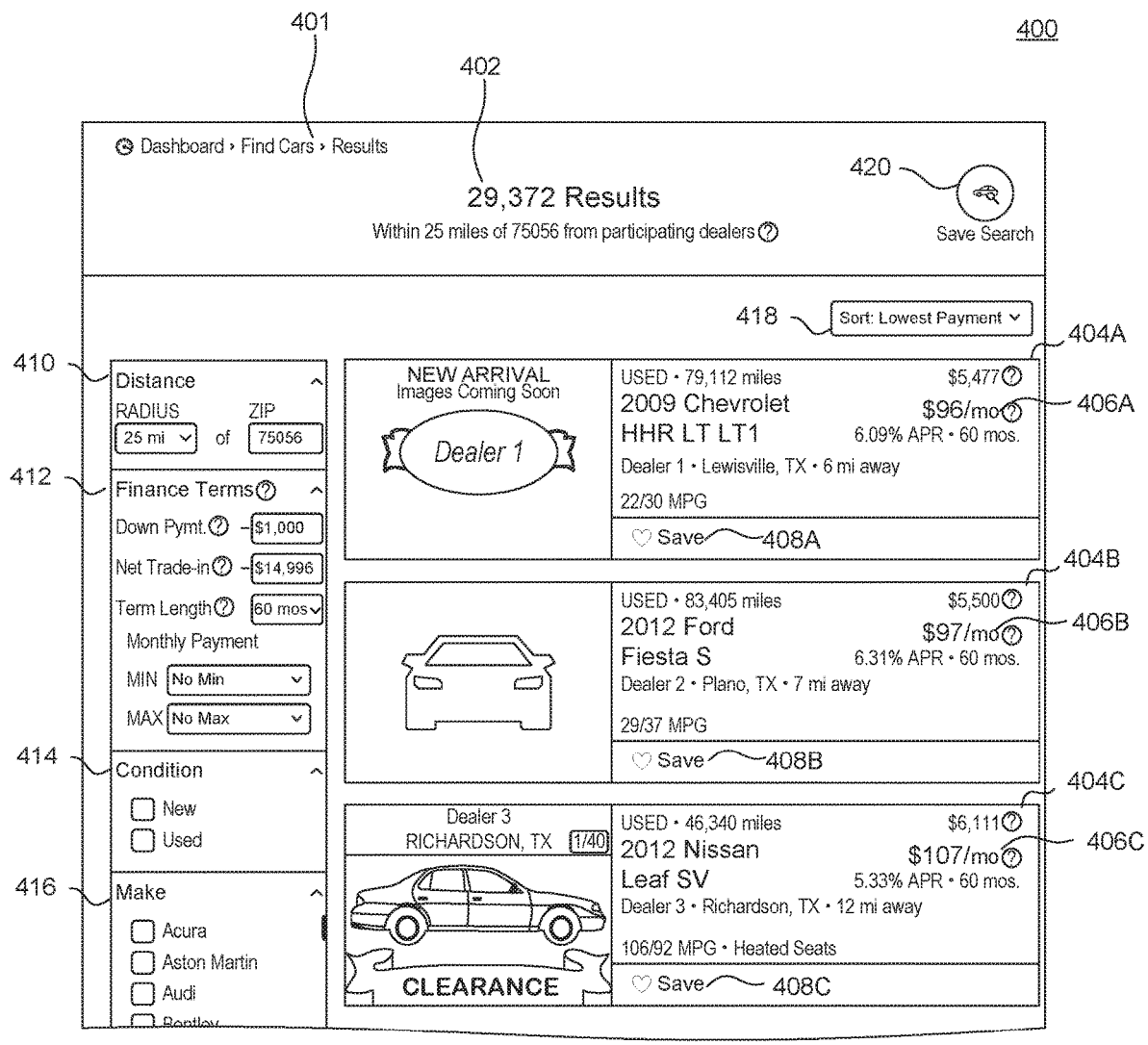
FIG. 4 is an example screen display of a results web page for an example use case, according to some embodiments.

User interface components 111 may be employed by sales management tool 110 to render a user interface that includes a search page for viewing by user 102 using computing device 104. User interface components 111 may include, for example, a JavaScript user interface library to facilitate dynamic interactions between user 102 and sales management tool 110. User interface components 111 may allow a business or organization to upgrade components used by sales management tool 110 to change the experience for user 102 over time. Thus, the look and feel of the particular page may change over time, and the screen display displayed in FIG. 4 is merely exemplary.

Search interface 112 may provide a visual mechanism through which user 102 may examine a representation of items within inventory 108. Search interface 112 may provide to user 102 a search result that includes a list of available items, e.g., a subset of the total inventory of available vehicles along with a wide array of other details about the items and performable operations thereon. In some embodiments, the subset of the total inventory of items may be a sequentially-ordered list of search results identified in the inventory based on a user search request. Search interface 112 may provide additional capabilities to user 102 to further limit, refine, sort, group, and otherwise interact with the search results. One exemplary example of a search interface is described below with reference to FIG. 4.

Data store 113 may be one or a plurality of data storage systems housing information relevant to, used in, and/or stored by sales management tool 110. Data store 113 may include a representation of each item in inventory 108. Data store 113 may further house parameters or characteristics of each items stored in inventory 108, such as pricing information, customer information, sales records, etc. For instance, data store 113 may be a database management system or relational database tool. As used herein, the term "database" refers to an organized collection of data. In some embodiments, a database may include a plurality of data tables comprising data values (e.g., alphanumeric strings, integers, decimals, floating points, dates, times, binary values, Boolean values, and/or enumerations). Some examples of databases include columnar databases, relational databases, key-store databases, graph databases, and document stores.

Data store 113 may further be a message queue or stream processing platform such as Apache Kafka or Apache Spark or other data storage systems like Apache Hadoop, HDFS, or Amazon S3, to name just some examples. Data store 113 may be a data lake, data silo, semi-structured data system (CSV, logs, xml, etc.), unstructured data system, binary data repository, or other suitable repository. Data store 113 may store thousands, millions, or more of objects, rows, transactions, records, files, logs, etc. while allowing for the creation, modification, retrieval, archival, and management of this data. In some embodiments, data store 113 uses scalable, distributed computing to efficiently catalog, sort, manipulate, and access stored data.

Search service engine 114 may be employed by sales management tool 110 to generate sorted search results and return the sorted search results to user 102 via search interface 112. To generate appropriate sorted search results, search service engine 114 may employ search actors (1)-(N) and search collector 118. In an embodiment, search service engine 114 may determine an intermediate result set of items based on a user search request. Then search service engine 114 may sort the items in the intermediate result set based on an attribute of the items, and divide the large dataset of the intermediate result set into a plurality of batches for search actor 116(1)-(N). In another embodiment, search service engine 114 divides the entire inventory into a plurality of batches without determining an intermediate result set of items.

Each batch may include a portion of items from the large dataset. Each batch may have a sequential identification number (ID) and may be assigned to one search actor 116. In some embodiments, these batches may be same size, for example, having same number of items. In some embodiments, these batches may be different sizes. Search service engine 114 may obtain a sequentially-ordered list of final results from search collector 118. By employing these components, search service engine 114 may narrow, limit, sort, and/or filter the results to identify the suitable items in inventory 108 based on a user search request much quicker than sorting items in a non-batch manner.

Search actor 116 may include a plurality of search actors 116(1)-(N), each of which can process items in one batch as divided by search service engine 114. Each search actor 116 can process items in one batch in parallel with other search actors. In some embodiments, search actor 116 may perform one or more of search, limit, calculate, sort, filter, or other processes on items in the batch.

Search collector 118 may collect results for each batch processed by search actor 116 for all the items of that batch. Each batch may have a sequential ID, but processing of all batches by search actor 116 may not finish in the same order as the sequential IDs of the batches would indicate. Search collector 118 thus may include a staging map to store the finished batch results. In some embodiments, the staging map may be a sorted map with a key and a value. The key may be the sequential ID of the finished batches, and the value may be the results for each item of the finished batches. The staging map can be any other suitable data structure(s) to store results associated with sequential IDs. After or while search collector 118 collects the processed results of the batches in the staging map, search collector 118 may create a sequentially-ordered list of the processed results based on the search request and the sequential IDs of the batches. For example, as soon as a next sequentially-numbered batch result is complete and stored in the staging map, the results from that batch may be added to the sequentially-ordered list of results. If a batch result other than the next sequentially-numbered batch result is completed and stored in the staging map, the results from that batch are not moved to the sequentially-ordered list of results until after the next sequentially-numbered batch result has been stored and processed.

In some embodiments, with the search request from user 102 and vehicle information from inventory 108, search service engine 114 of sales management tool 110 may determine an intermediate result set of vehicles based on the search request. Search service engine 114 may sort the intermediate result set based on a vehicle attribute and divide the intermediate result set into a plurality of batches of vehicles. Each of the plurality of batches may have a sequential ID. Search actors 116(1)-(N) may determine (e.g., process or generate) results corresponding to the search request attribute in parallel with each other through all the vehicles in each batch. Search collector 118 may collect the determined results from finished batches and create a sequentially-ordered list of results based on the results themselves (such as their values) and the sequential ID of each batch. Search service engine 114 may identify a subset of the determined results by comparing the determined results with a target result, determine a final set of items based on the subset of determined results, and return at least a portion of the final set of items to display on a results web page to user 102 while search actor 116 may continue to determine results for items in other batches. With this sorted parallel processing of a large dataset, user 102 can obtain search results faster than non-batch processing. This avoids the problem of processing each item in a large dataset, which can take significant computing time, particularly when user-specific data must be calculated for each inventory item prior to the sorting. This process is described in further detail below with reference to FIG. 5.

Figure 2:
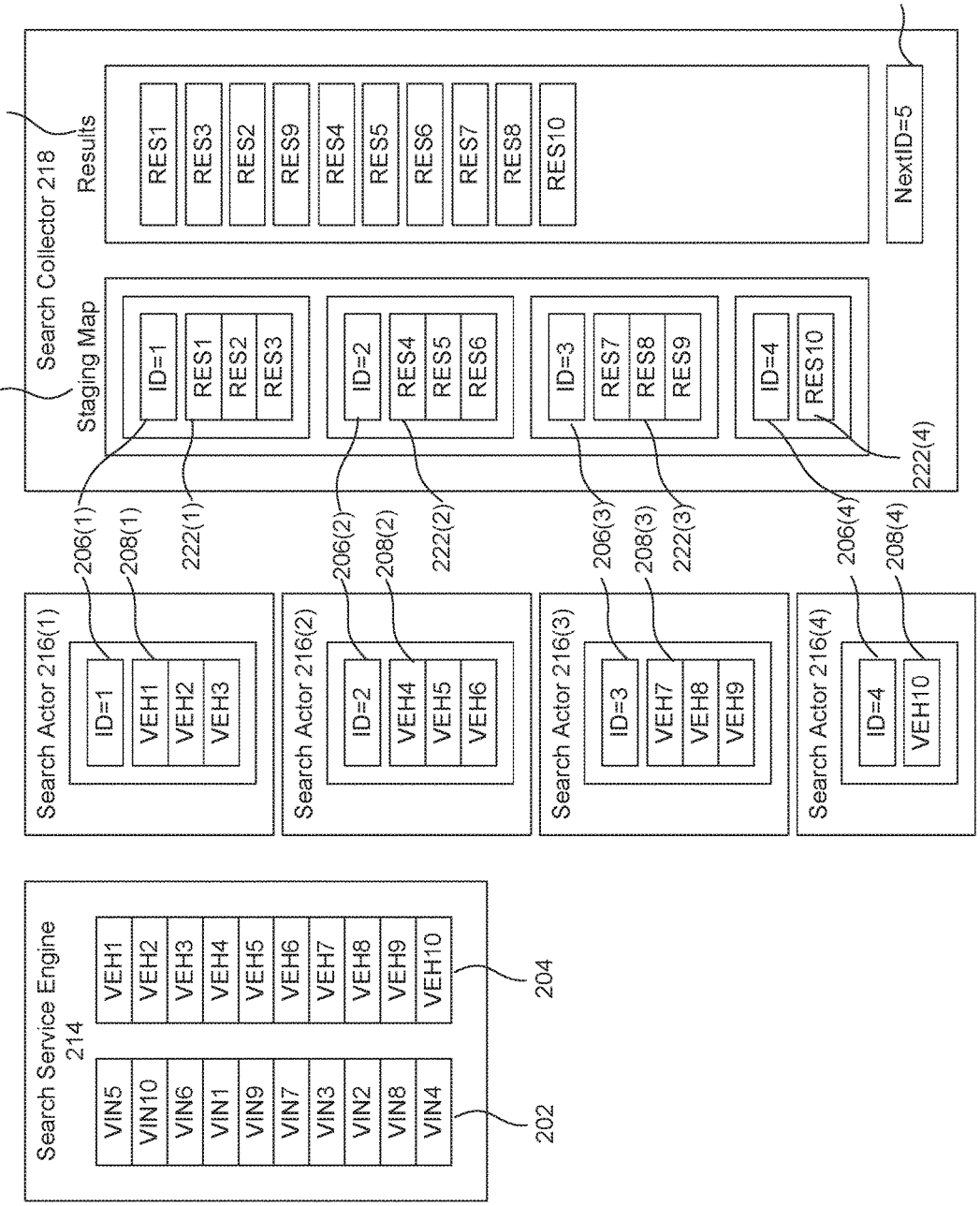
FIG. 2 is an example search flow for sorted parallel processing of a large dataset, according to some embodiments.

FIG. 2 is an example search flow 200 for sorted parallel processing of a large dataset, according to some embodiments. Search flow 200 can be performed by processing logic that can comprise hardware (e.g., circuitry, dedicated logic, programmable logic, microcode, etc.), software (e.g., instructions executing on a processing device), or a combination thereof. It is to be appreciated that more or fewer processes may be needed to perform the disclosure provided herein. Further, some of the processes may be performed simultaneously, or in a different order described herein, as will be understood by a person of ordinary skill in the art(s). Search flow 200 may include processes in search service engine 214, search actor 216, and search collector 218.

Search service engine 214 may determine an intermediate result set of vehicles 202 in a vehicle inventory based on a user search request, as shown in FIG. 2. The intermediate result set of vehicles 202 may include a large number of vehicles, for example, millions of vehicles. Search service engine 214 may sort these vehicles based on an attribute of the vehicles. Search service engine 214 may divide sorted intermediated result set of vehicles 204 into a plurality of batches with sequential IDs, for example, four batches as shown in FIG. 2.

Referring to FIG. 2, search actors 216(1)-(4) may process results for vehicles in batches 208(1)-(4) with sequential IDs 206(1)-(4) from 1 to 4, respectively. And search actors 216(1)-(4) may process results for vehicles in batches 208

(1)-(4) in parallel with each other. In some embodiments, batches 208(1)-(4) may have same number of vehicles. For example, batches 208(1)-(3) all have three vehicles in each batch and batch 208(4) has the last vehicle of a sorted intermediated result set. In some embodiments, batches 208(1)-(4) may have different numbers of vehicles. For example, batches with a smaller sequential ID may have a smaller numbers of vehicles than batches with a larger sequential ID.

Search collector 218 may collect determined results from search actors 216(1)-(4). Search collector 218 may have a staging map 210 to store the determined results, a list of results 212, and a next ID counter 220. When any one of search actors 216(1)-(4) finishes processing the items in its corresponding batch 208(1)-(4), search collector 218 may collect the determined results and associated sequential IDs in staging map 210. Each result in determined results 222(1)-(4) corresponds to a vehicle in corresponding batches 208(1)-(4), respectively. In some embodiments, search actor 216(1) may finish processing results earlier than search actor 216(2). In some embodiments, search actor 216(2) may finish processing results earlier than search actor 216(1). Search collector 218 may store finished results in staging map 210 when any one of search actors 216(1)-(4) finishes determining its results.

Search collector 218 may create list of results 212 based on sequential ID 206 (1)-(3). For example, search collector 218 may set next ID counter 220 corresponding to a next-expected sequential ID, for example 1. Search collector 218 may search for results associated with a sequential ID of 1. If result 222(1), whose sequential ID 206(1) is 1, is stored in staging map 210, search collector 218 can move result 222(1) for batch 208(1) into list of results 212. If search actor 216 (2) finishes first, search collector 218 may collect and store result 222(2) with sequential ID 206(2) of 2 in staging map 210. Search collector 218 may not update list of results 212 until results 221(1) with sequential ID 206(1) of 1 is collected in staging map 210. After search collector 218 moves results 221(1) to list of results 212, next ID counter 220 can increment to a next-in-sequence sequential ID, for example, 2. And after search collector 218 moves results 221(2) with sequential ID 206(2) of 2 to list of results 212, next ID counter 220 can increment to 3. Next ID counter 220 can continue incrementing to a next-in-sequence sequential ID until all search actors 261(1)-(4) finish processing results, or until a threshold sequential ID is reached.

FIG. 3 is an example use-case search result 300 for sorted parallel processing of a large dataset of vehicle inventories, where the vehicle inventories are to be sorted based on a monthly payment amount, according to some embodiments. Monthly payment of a vehicle depends on the price of the vehicle and an APR for the vehicle if a customer wants to finance it. Because the APR is dependent on the credit attributes of the customer, and will differ from customer to customer, a monthly payment may not be part of the existing vehicle information and may need to be calculated before sorting. But calculating a monthly payment for each vehicle in a large inventory may use significant computing time and resources, and may delay return of search results to a user if the search results cannot be sorted until the payment is calculated for all vehicles. Search results 300 in FIG. 3 illustrates a sorted parallel processing of a large inventory of vehicles, which can reduce computing time and enable quicker search results, according to some embodiments. Search results 300 may include vehicle batches 316(1)-(3), a sequentially-ordered list of results 312 with index 314 for each result, 0% APR (i.e., minimum) payment 315 for vehicles in each batch with a highest price and final results index 318. FIG. 3 may be described with reference to FIG. 2.

Vehicle batches 316(1)-(3) may include parameters such as vehicle ID 304, price 306, APR 308, and payment 310. According to some embodiments, search service engine 214 may sort vehicle batches 316(1)-(3) by a first parameter, such as price. Vehicle batches 316(1)-(3) have sequential IDs 1, 2, and 3 corresponding to each batch. With each vehicle batch 316(1)-(3) sorted by price and divided by sequential ID, vehicles in vehicle batches 316(1)-(3) have prices in ascending order from vehicle 1 to vehicle 15. As shown, the price of each vehicle in vehicle batch 316(2) is higher than each vehicle in vehicle batch 316(1). In some embodiments, an APR for each vehicle may be determined based on that vehicle's information and data corresponding to a particular customer. Search actor 216 can calculate APR 308, and in turn monthly payment 310 (which is based on the vehicle price and the corresponding APR), for vehicles in each vehicle batch in parallel. For example, vehicle 1 has a monthly payment of $193.00 for a 60 months term based on a price of $10000 and an APR of 6%.

Results 312 may be a list of payments calculated for each vehicle in vehicle batches 316(1)-(3). According to some embodiments, search collector 218 may collect results from vehicle batches that finish calculating a monthly payment and create a list of results 312 according to the sequential ID of vehicle batches. For example, after each vehicle in vehicle batch 316(1) has a calculated monthly payment 310 determined for a particular customer, search collector 218 may create the list of results 312 from these calculated monthly payments. Results 312 may have, in this example, 5 results with payments from $193.00 to $204.00. After results 312 is created with results from vehicle batch 316(1), next ID counter 220 may increment to 2 and search collector 218 may update results 312 with results from vehicle batch 316(2), which has a sequential ID of 2. Search collector 218 may repeat incrementing next ID 220 and updating results 312 with results from vehicle batches having a next-in-sequence sequential ID.

According to some embodiments, results 312 can be sorted and associated with an index 314 to indicate the order of a corresponding result in list of results 312. For example, after results 312 are created with the results from vehicle batch 316(1), result $193.00 may be the lowest monthly payment in these 5 results and have an index of 0. Result $204.00 may be the highest monthly payment in these 5 results and have an index of 4. Index 314 may update for each result when search collector 218 updates results 312 with results from a next-in-sequence vehicle batch. For example, after payment 310 is calculated for each vehicle in vehicle batch 316(2), search collector 218 can update results 312 with payment 310 from vehicle batch 316(2). Then result $206.00 may have an index of 5, and result $214.00 may have an index of 9.

According to some embodiments, a vehicle ID 313 may also be associated with each result of results 312. For example, as shown in FIG. 3, result $193.00 with an index 0 is the monthly payment of vehicle 1. The vehicle ID 313 of 1 can be listed along with result $193.00. Result $206.00 with index 5 is the monthly payment of vehicle 7. Accordingly, a vehicle ID 313 of 7 can be listed along with result $206.00. This allows the results returned in results 312 to be linked back to a specific inventory item, even if the order has changed.

Final result index 318 may be identified from index 314 of results 312, by considering which results meet a threshold as falling below a 0% APR payment 315. According to some embodiments, search collector 218 may identify final results index 318 by comparing list of results 312 having a 0% APR monthly payment with a highest price in each vehicle batch 316, and then determining which monthly payment options are lower than the 0% APR monthly payment option for that batch. For example, after search collector 218 creates list of results 312 with the payment for each vehicle in vehicle batch 316(1), results 312 may include 5 results with index 314 from 0 to 4. These five results correspond to five vehicles in vehicle batch 316(1). Vehicle 5 in vehicle batch 316(1) has a highest price of 10800. The 0% APR payment for vehicle 5 would be $180.00 for a 60 months term, which would be the lowest possible monthly payment for highest price vehicle 5. Vehicles from next-in-sequence batches, for example vehicle batch 316(2), would have a higher price than vehicle 5, and a higher monthly payment than $180.00, even with 0% APR. As all payments in results 312 would be higher than $180.00, the final list of lowest monthly payment may not be completely filled. As such, final results index 318 for a sorted monthly payment would include any vehicle listing having an index 314 at or below $180.00 (in this case, 0), and search collector 218 may then increment next ID 220 to 2.

After search collector 218 updates list of results 312 with a calculated payment for each vehicle in vehicle batch 316(2), the highest possible monthly payment for updated list of results 312 would be $214.00 for vehicle 9 with an index of 9. Vehicle 10 in vehicle batch 316(2) has highest price of 11800. The 0% APR payment 315 for vehicle 10 would be $197.00 for a 60 months term. So this would be the lowest possible monthly payment for highest price vehicle 10. Vehicles from any next-in-sequence batches, for example vehicle batch 316(3), would have a higher price than vehicle 10, and thus a higher minimum monthly payment than $197.00, even with 0% APR. Comparing with list of results 312 having a 0% APR payment $197.00, results in list of results 312 having indices 0, 1, and 2 are not higher than $197.00. Therefore, results in list of results 312 having indices 0, 1, and 2 would be selected as having the lowest monthly payment of the final results calculated thus far, and would be moved to a final results list. The final results index 318 then updates to 2.

After search collector 218 updates list of results 312 with payment information for each vehicle in vehicle batch 316(3), the highest monthly payment for updated list of results 312 would be $230.00 for vehicle 15 with an index of 14. Vehicle 15 in vehicle batch 316(3) has highest price of 12800. The 0% APR payment 315 for vehicle 15 would be $213.00 for a 60 months term. This would also be the lowest monthly payment for highest price vehicle 15. Vehicles from any next-in-sequence batches would have a higher price than vehicle 15, and a higher monthly payment than $213.00, even with 0% APR, so that $213.00 is selected as the new threshold for determining which vehicles can be moved to the final results list. Comparing the value of $213.00 with list of results 312, it can be seen that vehicles having indices 0-8 are not higher than $213.00. Therefore, list of results 312 with index 0-8 would fill out the first eight lowest monthly payment slots of the final results. And final results index 318 can update to 8.

In some embodiments, search collector 218 may repeat collecting results from vehicle batches having a sequential ID equal to a next ID counter 220, and incrementing next ID counter 220 until a final result set of items for all batches are determined and added to results 312. In some embodiments, stop flag 320 can be set to stop the sorted parallel processing when a threshold number of results is returned. For example, stop flag 320 can be set at 200. Search actor 216 may quickly process results for more than 200 vehicles using the batch processing described above, and start populating a result set with vehicles having a lowest monthly payment. When final results index 318 reaches 200 or is higher than 200, even if there are more items to be processed, search actor 216 can stop processing results for any remaining batches and the sorted parallel processing can stop. In this way, the described sorted parallel processing can reduce computing time while maintaining accuracy and completeness in the sort order, thus enabling a quicker return of search results.

In some embodiments, at least a portion of the sequentially-ordered list of results 312 may be presented to user 102. For example, user 102 may be concerned with the first ten or twenty sorted search results, where the sorted search results are displayed in available slots on a first results web page. Search service engine 214 may determine a number of vehicles available to be displayed on the results web page. And search service engine 214 may transmit a same number of vehicles in the sequentially-ordered list of results 312 to the results web page when the final results index is equal to or higher than the determined number. For example, the first results web page may be able to display 6 vehicles to user 102. After search collector 218 updates list of results 312 and final results index 318 with a payment amount for each vehicle in vehicle batch 316(2), final results index 318 would be 2, smaller than the 6 vehicles needed to be displayed. When search collector 218 updates results 312 and final results index 318 with a payment amount for each vehicle in vehicle batch 316(3), final results index 318 would be 8, larger than 6. At that point, search service engine 214 may transmit the first six results in results 312, which have indices 0 to 5, for filling the available slots in the webpage. These six results would have lowest payments out of all the vehicles, such that the user sees the first six results even before all monthly payments have been calculated for other vehicles in the inventory list.

In some embodiments, after the determined number of vehicles are transmitted and displayed to user 102, search service engine 214 may continue to determine list of results 312 and the final results index for next-in-sequence vehicle batches until all batches are added to results 312, or until final results index 318 is equal to or higher than stop flag 320. In this sorted parallel processing, sales management tool 110 can quickly calculate monthly payments and display a group of sorted results for vehicles that user 102 is concerned with. The results of other vehicles can be calculated after displaying the initial group of sorted results.

In some embodiments, user 102 may continue to narrow, limit, sort, and/or filter the results for the first results web page, to update the group of results displayed on the first results web page. For example, user 102 may update a search request with other search criteria, for example, vehicle make, vehicle model, vehicle condition, down payment, trade-in value, term length, monthly payment, distance, or other related information. Search service engine 214 may update the sequentially-ordered list of results 312 and final results index 318 according to the search criteria, and return an updated group of sorted results to user 102.

FIG. 4 is an example screen display of a results web page for an example use case, according to some embodiments. The screen display provided in FIG. 4 is merely exemplary, and one skilled in the relevant art(s) will appreciate that many approaches may be taken to provide a suitable screen display 400 in accordance with this disclosure. Screen display 400 provides a first results web page through which user 102 may view a group of vehicles sorted by monthly payment. User 102 may also narrow, sort, filter, and otherwise interact with the results. Screen display 400 may include navigation bar 401, results summary 402, sort panel 418, result list 404, vehicle distance selector 410, finance term selector 412, vehicle condition selector 414, vehicle make selector 416, and save search selector 420.

Navigation bar 401 may provide user 102 with the ability to navigate to other pages, tabs, subpages, etc. within sales management tool 110. In the exemplary embodiment illustrated in FIG. 4, navigation bar 401 includes "Dashboard," "Find Cars," and "Results." However, these options are merely exemplary and other suitable destinations/links may be provided and these exemplary options may be removed. User 102 may provide a search request on "Dashboard" to sales management tool 110 to find vehicles having parameters that match the user's search criteria.

Results summary 402 may provide user 102 with a number of vehicles identified based on the search request. For example, there are 29,372 results from participating dealers within 25 miles of the user's location (shown here as zip code 75056), as shown in FIG. 4. According to some embodiments, the inventory may be stored in a large dataset. A monthly payment for vehicles needs to be calculated when sorting vehicles by monthly payment. And as discussed above, calculating a monthly payment for each vehicle prior to sorting and returning the sorted results may expend significant computing resources and delay return of search results to user 102. However, sales management tool 110 with sorted parallel processing may more quickly provide user 102 with a relevant subset of search results on screen display 400 and continue processing results for other vehicles. In this way, sales management tool 110 may reduce computing time and enable quicker search results.

Sort panel 418 may allow user 102 to sort and refine the search result in a variety of manners across a multitude of dimensions. For example, in some embodiments, sort panel 418 may allow user 102 to sort by lowest payment, lowest price, condition, make, model, year, features, engine, MPG, color, fuel-type, etc. In some embodiments, sort panel 418 may include any suitable characteristic of the items in inventory 108. When user 102 updates sort panel 418, the displayed search results may be updated according to sort panel 418.

Vehicles 404, such as vehicle 404A, vehicle 404B, and vehicle 404C, may represent first three sorted search results of results 402. In the exemplary embodiment illustrated in screen display 400, vehicles 404 are displayed as sorted based on lowest-to-highest monthly payment 406. Vehicles 404A, 404B, and 404C represent the first three lowest payment vehicles listed in results 402. Sales management tool 110 may continue to calculate a monthly payment for other vehicles after displaying the first few lowest payment vehicles on the screen. As shown in FIG. 4, a variety of information can also be displayed for vehicles 404, e.g., condition, mileage, year, make, model number, price, APR, term, dealer, distance, and MPG. User 102 may save vehicles of interest by clicking buttons 408 for further comparison and reference.

Distance selector 410, finance term selector 412, condition selector 414, and make selector 416 may provide user 102 with further search criteria to narrow, limit, and/or filter results 402. For example, user 102 may update distance parameter 410 with a smaller distance from customer location. Results 402 may update based on the update of these search criteria. Sales management tool 110 may also update vehicles 404 displayed on screen display 400. Save search 420 may save the search results based on customer search request. User 102 may refer to saved searches for quick access.

Figure 5:
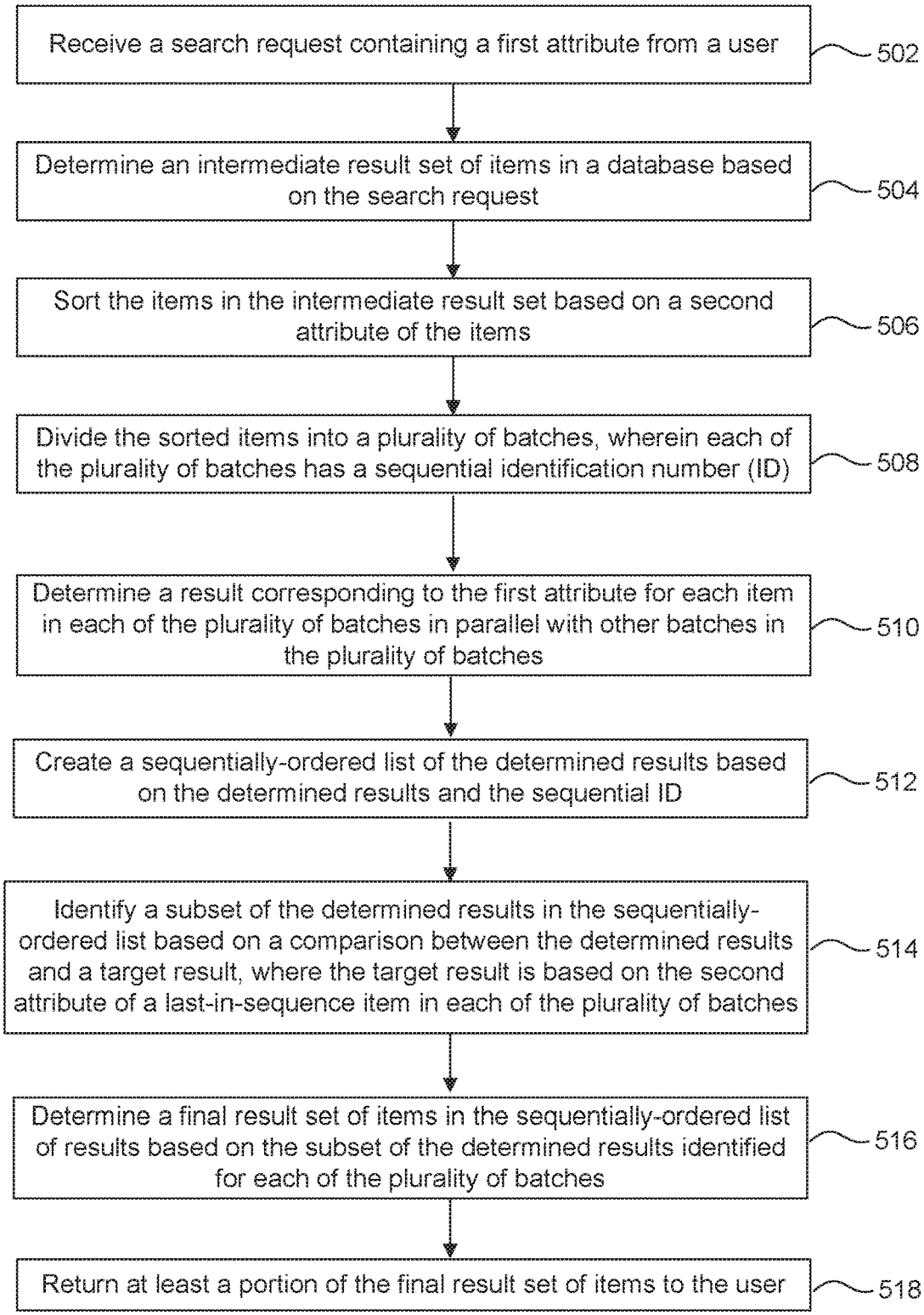
FIG. 5 is a flowchart illustrating a method of sorted parallel processing of a large dataset, according to some embodiments.

FIG. 5 is a flowchart illustrating a method of sorted parallel processing of a large dataset, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that more or fewer steps may be needed or to perform the disclosure provided herein. Further, some of the steps may be performed simultaneously, or in a different order than shown in FIG. 5, as will be understood by a person of ordinary skill in the art(s).

In 502, sales management tool 110 may receive a search request containing a first attribute from user 102. Generally the search request may be related to a potential purchase of a represented item in inventory 108, e.g., a request for available vehicles sorted by lowest-to-highest monthly payment. The first attribute may be an attribute not part of the inventory information, such as a monthly payment. For example, a monthly payment depends on the corresponding vehicle price and an APR available to that particular customer if the customer wants to finance it. And the customer may want to purchase a vehicle below a certain amount of monthly payment. In some embodiments, the search request may contain other attributes that are part of inventory information, such as price, mileage, distance from customer location, etc.

In 504, sales management tool 110 may determine an intermediate result set of items in a database based on the search request. The intermediate result set of items can be determined in inventory 108 based on the attributes that are part of the inventory information. For example, sales management tool 110 may determine an intermediate result set of vehicles based on, for example vehicle price, mileage, and distance from customer location. In some embodiments, sales management tool 110 may employ search service engine 114 to determine the intermediate result set of items from a database in data store 113, which may be a representation of inventory 108. The intermediate result set of items may be a large dataset, for example, including thousands of or millions of items.

In 506, sales management tool 110 may sort the items in the intermediate result set based on a second attribute of the items. Sales management tool 110 may employ search service engine 114 to sort the items in the intermediate result set. The second attribute may be part of inventory information. As the first attribute may not be part of the inventory information, search service engine 114 may not be able to sort the intermediate result set based on the first attribute and may need to sort based on the second attribute. For example, monthly payment for a vehicle is not part of vehicle information, and search service engine 114 cannot sort vehicles based on monthly payment before calculating it. Search service engine 114 may instead conduct an initial sort of vehicles based on vehicle price, which is part of vehicle information and related to monthly payment.

In 508, sales management tool 110 may divide the sorted items into a plurality of batches, and each of the plurality of batches may have a sequential ID. Sales management tool 110 may employ search service engine 114 to divide the sorted items into batches and create a sequential ID for each batch. Each batch may include a portion of the sorted items in the intermediate result set. In some embodiments, each batch may have a same number of items and the last batch may have the last few items. In some embodiments, different batches may have different numbers of items.

In 510, sales management tool 110 may determine a result corresponding to the first attribute for each item in each of the plurality of batches in parallel with other batches in the plurality of batches. Sales management tool 110 may employ search actor 116 to process through items in each of the batches in parallel. For example, referring to FIG. 3, payment 310 for each vehicle in all three batches can be determined in parallel with other batches.

In 512, sales management tool 110 may create a sequentially-ordered list of the determined results based on the determined results and the sequential ID. Search collector 118 may collect the determined results to create a sequentially-ordered list of the determined results. For example, referring to FIG. 3, results 312 can be a sequentially-ordered list of the determined results, and search collector 118 can create results 312 based on the determined results and the sequential ID of each batch. After results 312 update with payment from one batch, search collector 118 may continue to collect results from next-in-sequence batches until final result sets of vehicles for all batches are determined, or until the number of items in the final result set reaches a stop flag number 320.

In 514, search collector 118 may identify a subset of the determined results in the sequentially-ordered list based on a comparison between the determined results and a target result. The target result can be based on the second attribute of a last-in-sequence item in each of the plurality of batches. For example, referring to FIG. 3, 0% APR payment 315 for the highest price vehicle in each batch is calculated based on the price of the highest price vehicle in the bath. After comparing sequentially-ordered list of results 312 with 0% APR payment 315 (the target), a subset of results 312 can be identified as having monthly payments lower than that target. For example, comparing results 312 with $197.00 for highest price vehicle 10 in batch 316(2), a subset of results 312 with indices of 0, 1 and 2 are identified as those with the lowest monthly payment. But comparing results 312 with $213.00 for highest price vehicle 15 in batch 316(3), a subset of results 312 with indices less than 8 are identified as those with the lowest monthly payment. This ensures that all results are maintained in the appropriate sort order.

In 516, search collector 118 may determine a final result set of items in the sequentially-ordered list of results based on the subset of the determined results identified for each of the plurality of batches. For example, referring to FIG. 3, final results index 318 can identify the final result set of vehicles in the sequentially-ordered list of results 312 based on the subset of determined results identified for each batch. After search actor 116 processes batch 316(2), for example, and search collector updates results 312 with payment 310 for batch 316(2), the final result set of vehicles can be identified as results 312 having indices of 0, 1, and 2 (e.g., $193.00, $196.00, and $197.00) based on the target of $197.00 (0% APR payment 315 for the highest price vehicle in batch 316(2).

In 518, sales management tool 110 may return at least a portion of the final result set of items to user 102. Sales management tool 110 may employ search service engine 114 to return the portion of final result set of items. In some embodiments, search service engine 114 may determine a number of item slots available to display on a results web page to user 102. And search service engine 114 may populate each item slot with a corresponding result in the final result set based on the sequentially-order list of results. For example, referring to FIG. 3, user 102 may be concerned with a number of vehicles on a first results web page sorted by monthly payment. Search engine 114 may determine the number of vehicles available to be displayed on the results web page, for example, 6. Search collector 118 may identify the 6 lowest payment options in results 312 once final results index 318 is equal to or higher than 6. In some embodiments, sales management tool 110 may transmit a first group of results to user 102 once the number of results in the final result set is at least equal to the number of items slots available on the results web page. For example, referring to FIG. 3, sales management tool 110 may transmit the first 6 results in results 312 with indices 0-5 to user 102 when the final results index reaches 8, higher than the number of 6. Sales management tool 110 may continue to determine the final result set of payment estimates, and update the sequentially-ordered list of results 312 for other vehicles.

Figure 6:
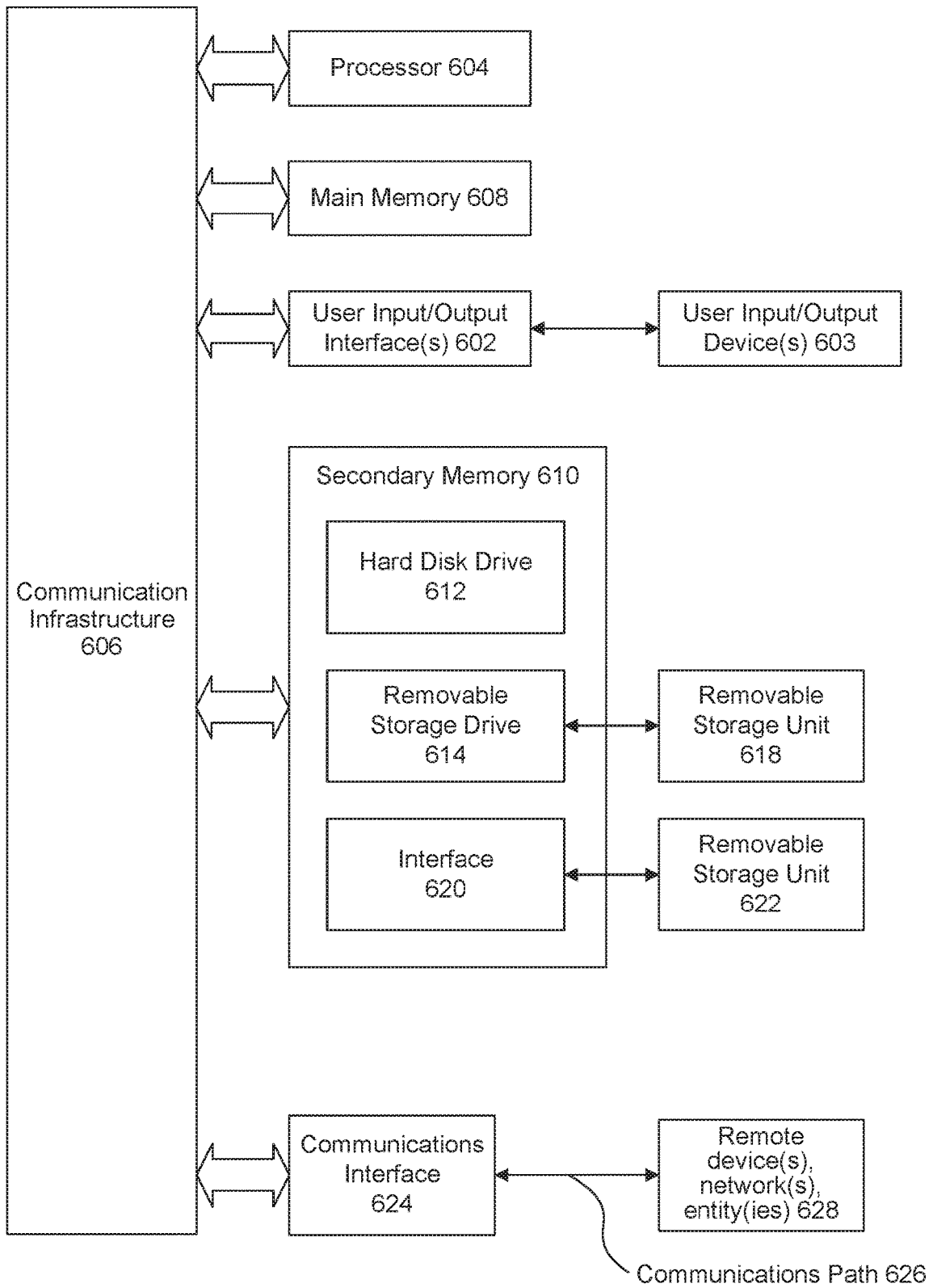
FIG. 6 is an example computer system useful for implementing various embodiments.

Various embodiments may be implemented, for example, using one or more computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 608, such as monitors, keyboards, pointing devices, etc., which may communicate with communication infrastructure 606 through user input/output interface(s) 602.

One or more of processors 604 may be a graphics processing unit (GPU). In some embodiments, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

References herein to "one embodiment," "an embodiment," "an example embodiment," "some embodiments," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method, comprising:
   receiving a search request containing a first attribute from a user's input in an interactive user interface of an application;

determining an intermediate result set of items in a database based on the search request;
sorting the items in the intermediate result set based on a second attribute, wherein the second attribute is a known attribute of each item and the second attribute is related to the first attribute;
dividing the sorted items into a plurality of batches, wherein each of the plurality of batches has a sequential identification number (ID);
determining the first attribute for each item using a plurality of search actors based on the second attribute of each respective item in a subset of the plurality of batches in parallel with other batches in the subset of the plurality of batches, wherein each of the plurality of search actors determines the first attribute for a respective batch of the subset;
collecting, via a search collector, the determined first attribute for each item in the subset of the plurality of batches into a staging map;
generating, via the search collector, a final result set of items prior to completion of determining the first attribute for all items in the plurality of batches, the generating the final result set of items comprising:
creating a sequentially-ordered list of items based on the determined first attribute in the staging map and the sequential ID in each of the subset of the plurality of batches;
identifying the final result set of items in the sequentially-ordered list of items based on a comparison between the determined first attribute of each item in the subset of the plurality of batches and a target-value, wherein the target value is based on the second attribute of a last-in-sequence item in each of the subset of the plurality of batches; and
adding additional items from the sequentially-ordered list of items to the final result set of items until a number of items in the final result set reaches a stop flag number; and
displaying, in response to the user's input, at least a portion of the final result set of items to the user in the interactive user interface while determining the first attribute for additional items in the plurality of batches using additional search actors,
wherein the receiving, determining, sorting, dividing, determining, collecting, generating, creating, identifying, adding, and displaying are performed by one or more computers.

2. The method of claim 1, wherein the displaying the at least a portion of the final result set of items comprises:
determining a number of item slots available on a results web page in the interactive user interface displayed to the user; and
populating each item slot with a corresponding item in the final result set of items.

3. The method of claim 2, wherein the populating each item slot comprises:
transmitting a first group of items in the final result set of items to the user once the number of items in the final result set is at least equal to the number of item slots available on the results web page; and
continuing to identify the final result set of items for a second group of items in the sequentially-ordered list of items.

4. The method of claim 1, wherein the creating the sequentially-ordered list of items comprises:
setting a sequential counter corresponding to a given sequential ID;
moving the determined first attribute of each item for a batch whose sequential ID matches the sequential counter from the staging map to the sequentially-ordered list of items; and
incrementing the sequential counter to a next-in-sequence sequential ID.

5. The method of claim 1, wherein the search request is a request to search an inventory of vehicles, and the first attribute comprises a monthly payment.

6. The method of claim 1, further comprising:
receiving search criteria in the interactive user interface from the user, wherein the search criteria-comprise a characteristic;
determining a subset of the final result set of items by limiting the final result set of items to items having the characteristic; and
presenting at least a portion of the subset of the final result set of items to the user in the interactive user interface.

7. The method of claim 6, wherein the characteristic comprises at least one of vehicle make, vehicle model, vehicle condition, down payment, trade-in value, term length, monthly payment, and distance.

8. A system, comprising:
a memory; and
at least one processor coupled to the memory and configured to:
receive a search request containing a first attribute from a user's input in an interactive user interface of an application;
determine an intermediate result set of items in a database based on the search request;
sort the items in the intermediate result set based on a second attribute, wherein the second attribute is a known attribute of each item and the second attribute is related to the first attribute;
divide the sorted items into a plurality of batches, wherein each of the plurality of batches has a sequential identification number (ID);
determine the first attribute for each item using a plurality of search actors based on the second attribute of each respective item in a subset of the plurality of batches in parallel with other batches in the subset of the plurality of batches, wherein each of the plurality of search actors determines the first attribute for a respective batch of the subset;
collect, via a search collector, the determined first attribute for each item in the subset of the plurality of batches into a staging map;
generate, via the search collector, a final result set of items prior to completion of determining the first attribute for all items in the plurality of batches, the generating the final result set of items comprising:
creating a sequentially-ordered list of items based on the determined first attribute in the staging map and the sequential ID in each of the subset of the plurality of batches;
identifying the final result set of items in the sequentially-ordered list of items based on a comparison between the determined first attribute of each item in the subset of the plurality of batches and a target-value, wherein the target value is based on the second attribute of a last-in-sequence item in each of the subset of the plurality of batches; and
adding additional items from the sequentially-ordered list of items to the final result set of items until a number of items in the final result set reaches a stop flag number; and display, in response to the user's input, at least a portion of the final result set of items to the user in the interactive user interface while determining the first attribute for additional items in the plurality of batches using additional search actors.

9. The system of claim 8, wherein the displaying the at least a portion of the final result set of items comprises:
   determining a number of item slots available on a results web page in the interactive user interface displayed to the user; and
   populating each item slot with a corresponding item in the final result set of items.

10. The system of claim 9, wherein the populating each item slot comprises:
   transmitting a first group of items in the final result set of items to the user once the number of items in the final result set is at least equal to the number of item slots available on the results web page; and
   continuing to identify the final result set of items for a second group of items in the sequentially-ordered list of items.

11. The system of claim 8, wherein the creating the sequentially-ordered list of items comprises:
   setting a sequential counter corresponding to a given sequential ID;
   moving the determined first attribute of each item for a batch whose sequential ID matches the sequential counter from the staging map to the sequentially-ordered list of items; and
   incrementing the sequential counter to a next-in-sequence sequential ID.

12. The system of claim 8, wherein the search request is a request to search an inventory of vehicles, and the first attribute comprises a monthly payment.

13. A non-transitory computer-readable device having instructions stored thereon that, when executed by at least one computing device, cause the at least one computing device to perform operations comprising:
   receiving a search request containing a first attribute from a user's input in an interactive user interface of an application;
   determining an intermediate result set of items in a database based on the search request;
   sorting the items in the intermediate result set based on a second attribute, wherein the second attribute is a known attribute of each item and the second attribute is related to the first attribute;
   dividing the sorted items into a plurality of batches, wherein each of the plurality of batches has a sequential identification number (ID);
   determining the first attribute for each item using a plurality of search actors based on the second attribute of each respective item in a subset of the plurality of batches in parallel with other batches in the subset of the plurality of batches, wherein each of the plurality of search actors determines the first attribute for a respective batch of the subset;
   collecting, via a search collector, the determined first attribute for each item in the subset of the plurality of batches into a staging map;
   generating, via the search collector, a final result set of items prior to completion of determining the first attribute for all items in the plurality of batches, the generating the final result set of items comprising:
      creating a sequentially-ordered list of items based on the determined first attribute in the staging map and the sequential ID in each of the subset of the plurality of batches;
      identifying the final result set of items in the sequentially-ordered list of items based on a comparison between the determined first attribute of each item in the subset of the plurality of batches and a target-value, wherein the target value is based on the second attribute of a last-in-sequence item in each of the subset of the plurality of batches; and
      adding additional items from the sequentially-ordered list of items to the final result set of items until a number of items in the final result set reaches a stop flag number; and
   displaying, in response to the user's input, at least a portion of the final result set of items to the user in the interactive user interface while determining the first attribute for additional items in the plurality of batches using additional search actors.

14. The non-transitory computer-readable device of claim 13, wherein the displaying the at least a portion of the final result set of items comprises:
   determining a number of item slots available on a results web page in the interactive user interface displayed to the user; and
   populating each item slot with a corresponding item in the final result set of items.

15. The non-transitory computer-readable device of claim 14, wherein the populating each item slot comprises:
   transmitting a first group of items in the final result set of items to the user once the number of items in the final result set is at least equal to the number of item slots available on the results web page; and
   continuing to identify the final result set of items for a second group of items in the sequentially-ordered list of items.

16. The non-transitory computer-readable device of claim 13, wherein the creating the sequentially-ordered list of items comprises:
   setting a sequential counter corresponding to a given sequential ID;
   moving the determined first attribute of each item for a batch whose sequential ID matches the sequential counter from the staging map to the sequentially-ordered list of items; and
   incrementing the sequential counter to a next-in-sequence sequential ID.

17. The non-transitory computer-readable device of claim 13, wherein the search request is a request to search an inventory of vehicles, and the first attribute comprises a monthly payment.

18. The system of claim 8, further configured to:
   receive search criteria in the interactive user interface from the user, wherein the search criteria comprise a characteristic;
   determine a subset of the final result set of items by limiting the final result set of items to items having the characteristic; and
   present at least a portion of the subset of the final result set of items to the user in the interactive user interface.

19. The system of claim 18, wherein the characteristic comprises at least one of vehicle make, vehicle model, vehicle condition, down payment, trade-in value, term length, monthly payment, and distance.

20. The non-transitory computer-readable device of claim 13, further comprising:

receiving search criteria in the interactive user interface from the user, wherein the search criteria comprises a characteristic;

determining a subset of the final result set of items by limiting the final result set of items to items having the characteristic; and presenting at least a portion of the subset of the final result set of items to the user in the interactive user interface.

* * * * *